United States Patent
Thomson et al.

(10) Patent No.: US 8,325,087 B2
(45) Date of Patent: Dec. 4, 2012

(54) SYSTEM AND METHOD FOR SERVER SIDE DETECTION OF FALSIFIED SATELLITE MEASUREMENTS

(75) Inventors: Martin Thomson, Keiraville (AU); Neil Harper, Mangerton (AU)

(73) Assignee: Andrew LLC, Hickory, NC (US)

( * ) Notice: Subject to any disclaimer, the term of this patent is extended or adjusted under 35 U.S.C. 154(b) by 0 days.

(21) Appl. No.: 13/269,729

(22) Filed: Oct. 10, 2011

(65) Prior Publication Data

US 2012/0026037 A1    Feb. 2, 2012

Related U.S. Application Data

(63) Continuation of application No. 12/276,917, filed on Nov. 24, 2008, now Pat. No. 8,035,557.

(51) Int. Cl.
*G01S 19/21* (2010.01)
*G01S 19/06* (2010.01)

(52) U.S. Cl. ............ 342/357.59; 342/357.43

(58) Field of Classification Search ............ 342/357.42, 342/357.43, 357.58, 357.59
See application file for complete search history.

(56) References Cited

U.S. PATENT DOCUMENTS

| | | | |
|---|---|---|---|
| 7,436,355 B2 * | 10/2008 | Nicholson et al. | 342/357.58 |
| 7,522,098 B2 * | 4/2009 | van Diggelen | 342/357.25 |
| 2005/0270232 A1 * | 12/2005 | Masuda | 342/357.02 |

* cited by examiner

*Primary Examiner* — Cassie Galt
(74) *Attorney, Agent, or Firm* — Duane Morris LLP

(57) ABSTRACT

A system and method for determining whether a wireless device has transmitted one or more forged satellite measurements. An estimated location of the wireless device may be determined as a function of information from a cellular network. Acquisition assistance data may be determined for a first set of satellites as a function of the estimated location, the assistance data including an uncertainty window. If measured code phase information in the satellite measurements substantially correlates to the uncertainty window, then the wireless device may be transmitting forged satellite measurements.

23 Claims, 10 Drawing Sheets

SYSTEM AND METHOD FOR SERVER SIDE DETECTION OF FALSIFIED SATELLITE MEASUREMENTS

RELATED APPLICATIONS

The instant application is a continuation of U.S. application Ser. No. 12/276,917, entitled "System and Method for Server Side Detection of Falsified Satellite Measurements" filed Nov. 24, 2008, now U.S. Pat. No. 8,035,557, and is related to U.S. application Ser. No. 12/276,804, entitled, "System and Method for Determining Falsified Satellite Measurements," filed Nov. 24, 2008, now U.S. Pat. No. 7,940, 213, U.S. application Ser. No. 12/325,612, entitled, "System and Method of Protecting Against Spoofed A-GNSS Measurement Data," filed Dec. 1, 2008, now U.S. Pat. No. 7,956, 803, U.S. application Ser. No. 12/276,852, entitled, "System and Method for Determining Falsified Geographic Location of a Mobile Device," filed Nov. 24, 2008, now U.S. Pat. No. 7,800,533, the entirety of each is hereby incorporated herein by reference.

BACKGROUND

Radio communication systems generally provide two-way voice and data communication between remote locations. Examples of such systems are cellular and personal communication system ("PCS") radio systems, trunked radio systems, dispatch radio networks, and global mobile personal communication systems ("GMPCS") such as satellite-based systems. Communication in these systems is conducted according to a pre-defined standard. Mobile devices or stations, also known as handsets, portables or radiotelephones, conform to the system standard to communicate with one or more fixed base stations. It is important to determine the location of such a device capable of radio communication especially in an emergency situation. In addition, in 2001 the United States Federal Communications Commission ("FCC") required that cellular handsets must be geographically locatable. This capability is desirable for emergency systems such as Enhanced 911 ("E-911"). The FCC requires stringent accuracy and availability performance objectives and demands that cellular handsets be locatable within 100 meters 67% of the time for network based solutions and within 50 meters 67% of the time for handset based solutions.

Current generations of radio communication generally possess limited mobile device location determination capability. In one technique, the position of the mobile device is determined by monitoring mobile device transmissions at several base stations. From time of arrival or comparable measurements, the mobile device's position may be calculated. However, the precision of this technique may be limited and, at times, may be insufficient to meet FCC requirements. In another technique, a mobile device may be equipped with a receiver suitable for use with a Global Navigation Satellite System ("GNSS") such as the Global Positioning System ("GPS"). GPS is a radio positioning system providing subscribers with highly accurate position, velocity, and time ("PVT") information.

FIG. 1 is a schematic representation of a constellation 100 of GPS satellites 101. With reference to FIG. 1, GPS may include a constellation of GPS satellites 101 in non-geosynchronous orbits around the earth. The GPS satellites 101 travel in six orbital planes 102 with four of the GPS satellites 101 in each plane. Of course, a multitude of on-orbit spare satellites may also exist. Each orbital plane has an inclination of 55 degrees relative to the equator. In addition, each orbital plane has an altitude of approximately 20,200 km (10,900 miles). The time required to travel the entire orbit is just under 12 hours. Thus, at any given location on the surface of the earth with clear view of the sky, at least five GPS satellites are generally visible at any given time.

With GPS, signals from the satellites arrive at a GPS receiver and are conventionally utilized to determine the position of the receiver. GPS position determination is made based on the time of arrival ("TOA") of various satellite signals. Each of the orbiting GPS satellites 101 broadcasts spread spectrum microwave signals encoded with satellite ephemeris information and other information that allows a position to be calculated by the receiver. Presently, two types of GPS measurements corresponding to each correlator channel with a locked GPS satellite signal are available for GPS receivers. The two carrier signals, L1 and L2, possess frequencies of 1.5754 GHz and 1.2276 GHz, or wavelengths of 0.1903 m and 0.2442 m, respectively. The L1 frequency carries the navigation data as well as the standard positioning code, while the L2 frequency carries the P code and is used for precision positioning code for military applications. The signals are modulated using bi-phase shift keying techniques. The signals are broadcast at precisely known times and at precisely known intervals and each signal is encoded with its precise transmission time. There is also an L2C signal being transmitted by several satellites. The LC2C signal is a second civilian frequency transmitted by GPS satellites. L1 transmits the Coarse Acquisition ("C/A") code. L2C transmits L2CM (civil-moderate) and L2CL (civil long) codes. These codes allow a device to differentiate between satellites that are all transmitting on the same frequency. The C/A code is 1 milliseconds long, the L2CM is 20 milliseconds long and the L2CL is 1.5 seconds long. The L2C codes provide a more robust cross-correlation performance so that reception of weak GPS signals is less affected by simultaneously received strong GPS signals. The civil navigation message ("CNAV") is the broadcast model that can be transmitted on the L2C and provides a more accurate and frequent message than the legacy navigation message.

GPS receivers measure and analyze signals from the satellites, and estimate the corresponding coordinates of the receiver position, as well as the instantaneous receiver clock bias. GPS receivers may also measure the velocity of the receiver. The quality of these estimates depends upon the number and the geometry of satellites in view, measurement error and residual biases. Residual biases generally include satellite ephemeris bias, satellite and receiver clock errors, and ionospheric and tropospheric delays. If receiver clocks were perfectly synchronized with the satellite clocks, only three range measurements would be needed to allow a user to compute a three-dimensional position. This process is known as multilateration. However, given the engineering difficulties and the expense of providing a receiver clock whose time is exactly synchronized, conventional systems generally account for the amount by which the receiver clock time differs from the satellite clock time when computing a receiver's position. This clock bias is determined by computing a measurement from a fourth satellite using a processor in the receiver that correlates the ranges measured from each satellite. This process requires four or more satellites from which four or more measurements can be obtained to estimate four unknowns x, y, z, b. The unknowns are latitude, longitude, altitude and receiver clock offset. The amount b, by which the processor has added or subtracted time, is the instantaneous bias between the receiver clock and the satellite clock. It is possible to calculate a location with only three satellites when additional information is available. For example, if the altitude of the handset or mobile device is well known, then an arbitrary satellite measurement may be included that is centered at the center of the earth and possesses a range defined as the distance from the center of the earth to the known altitude of the handset or mobile device. The altitude of the handset may be known from another sensor or from information from the cell location in the case where the handset is in a cellular network.

Assisted-GPS ("A-GPS") has gained significant popularity recently in light of stringent time to first fix ("TTFF"), i.e., first position determination and sensitivity, requirements of the FCC E-911 regulations. In A-GPS, a communications network and associated infrastructure may be utilized to assist the mobile GPS receiver, either as a standalone device or integrated with a mobile station or device. The general concept of A-GPS is to establish a GPS reference network (and/or a wide-area D-GPS network or a wide area reference network ("WARN")) including receivers with clear views of the sky that may operate continuously. This reference network may also be connected with the cellular infrastructure, may continuously monitor the real-time constellation status, and may provide data for each satellite at a particular epoch time. For example, the reference network may provide ephemeris information, UTC model information, ionosphere model information, and other broadcast information to the cellular infrastructure. As one skilled in the art would recognize, the GPS reference receiver and its server (or position determining entity) may be located at any surveyed location with an open view of the sky. Typical A-GPS information may include data for determining a GPS receiver's approximate position, time synchronization mark, satellite ephemerides, various model information and satellite dopplers. Different A-GPS services may omit some of these parameters; however, another component of the supplied information is the identification of the satellites for which a device or GPS receiver should search. From such assistance data, a mobile device will attempt to search for and acquire satellite signals for the satellites included in the assistance data. If, however, satellites are included in the assistance data that are not measurable by the mobile device (e.g., the satellite is no longer visible, etc.), then the mobile device will waste time and considerable power attempting to acquire measurements for the satellite.

Civilian GPS signals are vulnerable to attacks such as blocking, jamming and spoofing. The goal of such attacks generally is to prevent a position lock (e.g., blocking and jamming) or to feed a receiver false information so that the receiver computes an erroneous time or location (e.g., spoofing). GPS receivers are generally aware when blocking or jamming is occurring because the receivers encounter a loss of signal. Spoofing, however, is a surreptitious attack. Currently, no countermeasures are in use for detecting spoofing attacks.

Civilian GPS signals are widely used by government and private industries for important applications, including, but not limited to, public safety services, navigation, geolocation, hiking, surveying, robotics, tracking, etc. Unfortunately, civilian GPS signals are not secure. Since GPS signal strength, measured at the Earth's surface at about −160 dBw ($1 \times 10^{-16}$ watts), is roughly equivalent to viewing a 25 watt light bulb from a distance of 10,000 miles, GPS signals may be blocked by destroying or shielding a receiver's antenna and may be jammed by a signal of a similar frequency but greater strength. As stated above, however, blocking and jamming are not the greatest security risk. A more pernicious attack involves feeding the receiver fake or forged satellite signals so that the receiver believes it is located somewhere in space and time that it is not. Spoofing may be accomplished by utilizing a GPS satellite simulator. Such simulators are uncontrolled and widely available. To conduct the spoofing attack, an adversary may broadcast a forged satellite signal with a higher signal strength than the true signal, and the GPS receiver believes that the forged signal is actually a true GPS signal. The receiver may then proceed to calculate erroneous position or time information based on this forged signal.

It is also possible for an unscrupulous user or intermediary to alter the software in a wireless device to manipulate satellite measurements thereby causing a location determining system to calculate an incorrect location. This method of spoofing is generally termed as location spoofing. Generally, if satellite measurements are manipulated in a wireless device randomly, it is likely that a resulting position calculation will fail because the position of the respective satellites will be too far away from the actual code phase indicated location; however, a skillful user may calculate code phases that are required to result in the calculation of a spoofed or false location by the location determining system.

Although embodiments of the present subject matter may not prevent spoofing attacks, these embodiments may alert a wireless device user and/or an operator of a location determining system to such suspicious activity thereby decreasing the probability that a spoofing attack succeeds. Further embodiments of the present subject matter may be implemented easily and inexpensively by retrofitting existing GPS receivers and exemplary location determining systems.

Accordingly, there is a need for a method and system for determining falsified satellite measurements and/or falsified locations of a mobile device that would overcome the deficiencies of the prior art. Therefore, an embodiment of the present subject matter provides a method for determining whether a wireless device has transmitted one or more forged satellite measurements. The method may comprise determining an estimated location of the wireless device from signals received from a cellular network. For each one of the first set of satellites from which the wireless device receives a signal, expected frequency information may be determined as a function of the estimated location, actual frequency information may be measured, and the expected and measured frequency information compared. The wireless device may then be identified as having transmitted a forged satellite measurement if a difference between the expected and measured frequency information is greater than a predetermined threshold.

Another embodiment of the present subject matter provides a method for determining whether a wireless device has transmitted a forged satellite measurement. The method comprises receiving at the wireless device signals from a plurality of satellites and determining an estimated location of the wireless device as a function of signals provided by a cellular network. Expected Doppler shift of ones of the received signals may be compared with the actual Doppler shift of the ones of received signals, and the wireless device identified as having transmitted a forged measurement if the expected and actual Doppler shifts do not substantially correspond within a predetermined threshold.

A further embodiment of the present subject matter may provide a method for determining whether an estimated location of a wireless device includes one or more forged satellite measurements. The method may comprise receiving at the wireless device signals from a first set of satellites for a region in which the wireless device is located and determining an estimated location of the wireless device from the signals received from the first set of satellites. The estimated location may then be identified as having a forged satellite measurement if the estimated location is not within the region.

One embodiment of the present subject matter provides a system for determining whether a wireless device has transmitted one or more forged satellite measurements. The system may comprise circuitry for determining an estimated location of the wireless device and circuitry for determining expected frequency information as a function of the estimated location. The system may also comprise circuitry for measuring actual frequency information and circuitry for comparing the expected frequency information with the measured frequency information. The system may then include circuitry for identifying the wireless device as having transmitted a forged satellite measurement if the difference between the expected and measured frequency information is greater than a predetermined threshold.

In yet another embodiment of the present subject matter a method for determining whether an estimated location of a wireless device includes one or more forged satellite measurements is provided. The method may comprise determining an estimated location of the wireless device from signals received from a first set of satellites and obtaining a set of residuals as a function of the estimated location. The obtained set of residuals may be compared to a reference set of residuals, and the estimated location identified as having one or more forged satellite measurements if the comparison between the obtained set and reference set of residuals is less than a predetermined threshold.

An additional embodiment of the present subject matter provides a method for determining whether an estimated location of a wireless device includes a forged satellite measurement. The method may comprise receiving at the wireless device signals from a plurality of satellites and determining an estimated location of the wireless device from the received signals. A set of residuals obtained from the estimated location may be compared with a reference set of residuals, and the estimated location then identified as having a forged satellite measurement if the comparison is less than a predetermined threshold.

One further embodiment may also provide a system for determining whether an estimated location of a wireless device includes one or more forged satellite measurements. The system may include circuitry for determining an estimated location of the wireless device from signals received from a set of satellites and circuitry for calculating a set of residuals as a function of the estimated location. The system may also include a database having information from a reference station network, circuitry for comparing the obtained set of residuals to a reference set of residuals provided by the reference network, and circuitry for identifying the estimated location as having one or more forged satellite measurements if the comparison between the obtained set and reference set of residuals is less than a predetermined threshold.

An embodiment of the present subject matter may also provide a method for determining whether a wireless device has transmitted one or more forged satellite measurements. The method may include the steps of determining an estimated location of the wireless device and determining acquisition assistance data for a first set of satellites as a function of the estimated location, the assistance data including an uncertainty window. The wireless device may then be identified as having transmitted one or more forged satellite measurements if the measured code phase information substantially correlates to the uncertainty window.

An additional embodiment of the present subject matter may provide a method for determining whether a wireless device has transmitted one or more forged satellite measurements. The method may include the steps of determining an estimated location of the wireless device and determining acquisition assistance data for a first set of satellites as a function of the estimated location. For ones of the first set of satellites from which the wireless device receives a signal, measured code phase information may be compared to code phase information in the determined acquisition assistance data. The wireless device may then be identified as having transmitted one or more forged satellite measurements if a difference between measured code phase information for ones of the first set of satellites and code phase information in the determined acquisition assistance data for the same ones of satellites is greater than a predetermined threshold.

One further embodiment may provide a system for determining whether a wireless device has transmitted one or more forged satellite measurements. The system may include circuitry for determining an estimated location of the wireless device and circuitry for determining acquisition assistance data for a first set of satellites as a function of the estimated location, the assistance data including an uncertainty window. The system may also include circuitry for identifying the wireless device as having transmitted one or more forged satellite measurements if received code phase information from the wireless device substantially correlates to the uncertainty window.

These embodiments and many other objects and advantages thereof will be readily apparent to one skilled in the art to which the invention pertains from a perusal of the claims, the appended drawings, and the following detailed description of the embodiments.

DETAILED DESCRIPTION

Figure 1:
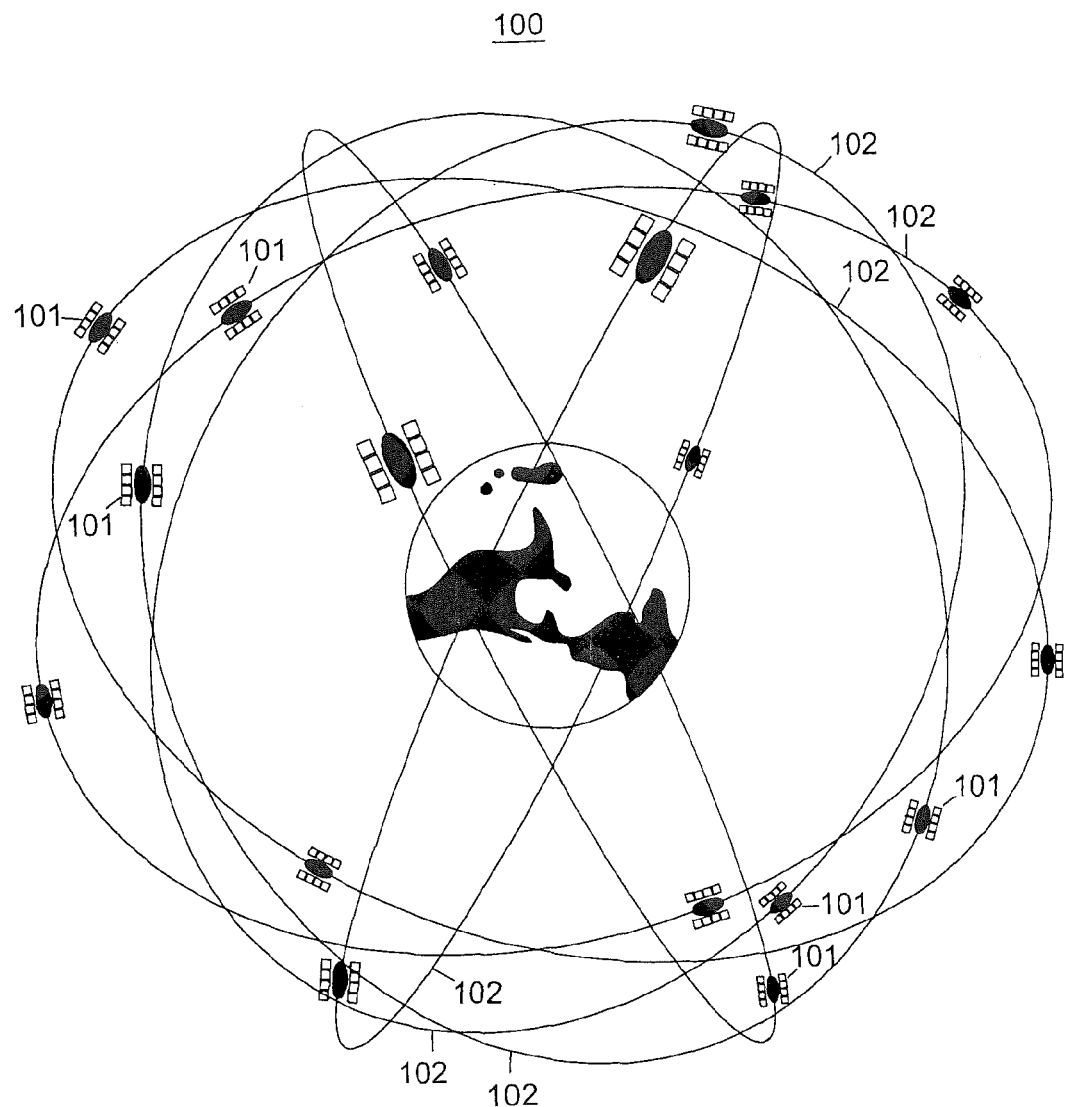
FIG. 1 is a schematic representation of a constellation of GPS satellites.

With reference to the figures where like elements have been given like numerical designations to facilitate an understanding of the present subject matter, the various embodiments of a system and method for determining falsified satellite measurements and falsified geographic locations are herein described.

The disclosure relates to a mobile appliance or device and a location determining system using satellite signals and/or measurements of these satellite signals. Exemplary devices may include, but are not limited to, a cellular device, text messaging device, computer, portable computer, vehicle locating device, vehicle security device, communication device, and wireless transceiver. The satellites may be considered as part of a Global Navigation Satellite System ("GNSS"), such as, but not limited to, the U.S. Global Positioning System ("GPS"). While the following description references the GPS system, this in no way should be interpreted as limiting the scope of the claims appended herewith. As is known to those of skill in the art, other GNSS systems operate, for the purposes of this disclosure, similarly to GPS, such as, but not limited to, the European Satellite project, Galileo; the Russian satellite navigation system, GLONASS; the Japanese Quasi-Zenith Satellite System ("QZSS"), and the Chinese satellite navigation and positioning system called Beidou (or Compass). Therefore, references in the disclosure to GPS and/or GNSS, where applicable, as known to those of skill in the art, apply to the above-listed GNSS systems as well as other GNSS systems not listed above. Further, the terms spoofed, falsified, forged, and various tenses and forms thereof are utilized interchangeably throughout this disclosure and such use should in no way should be interpreted as limiting the scope of the claims appended herewith.

Generally wireless A-GPS devices or handsets have a low time to first fix ("TTFF") as the devices are supplied with assistance data from an exemplary communications network to assist in locking onto or acquiring satellites quickly. Exemplary A-GPS devices may include, but are not limited to, a cellular device, text messaging device, computer, portable computer, vehicle locating device, vehicle security device, communication device, and wireless transceiver. These devices may provide satellite measurements back to a location determining system to perform a position calculation. Exemplary network elements that supply the assistance data and/or perform the position calculation may be a location determining system such as a Mobile Location Center ("MLC"), location information server or system ("LIS"), or other comparable network element. The location determining system may generally be a node in a wireless network that performs the location of a mobile device. The location determining system generally requires a wireless device to provide true and accurate measurements (rather than forged measurements) to determine an accurate location or provide accurate assistance data. The integrity of the resulting location is important because the location may be used by emergency services operators to find an injured person, for location-based services, etc.

Figure 2:
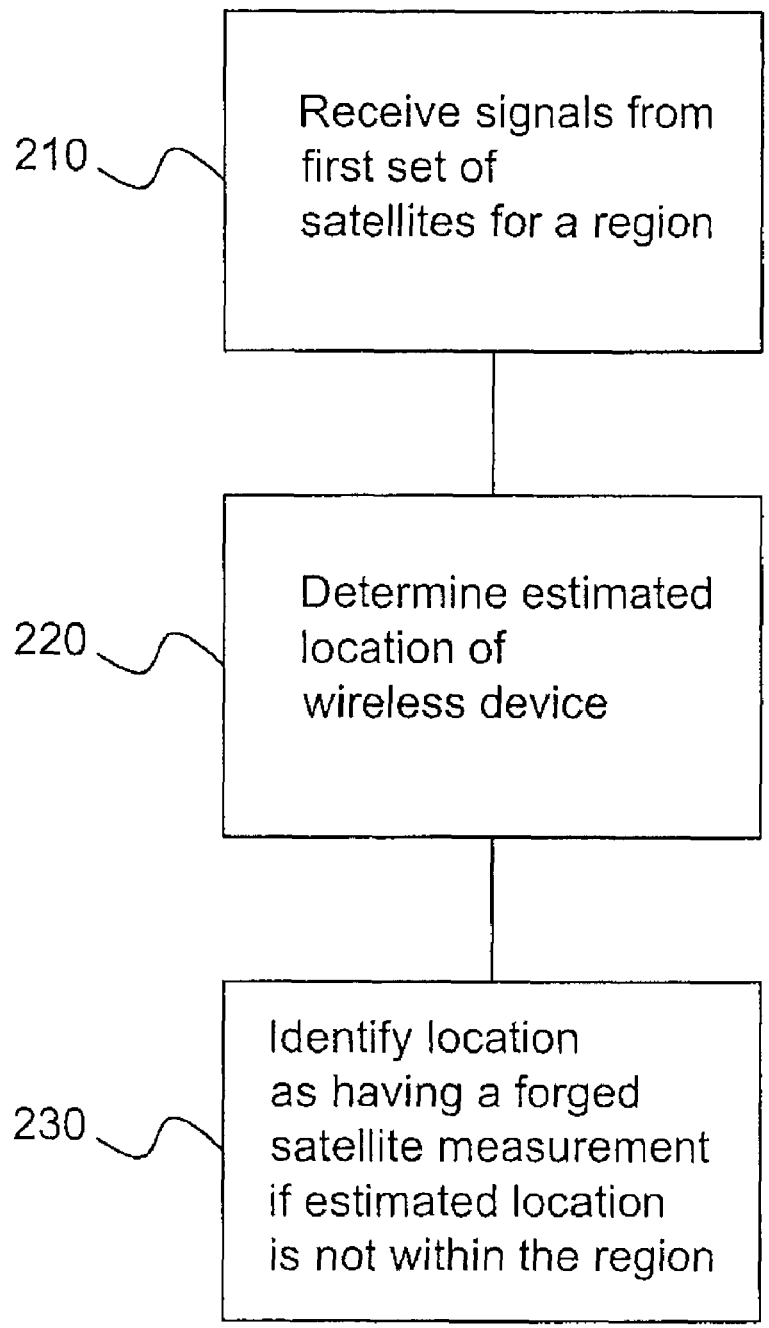
FIG. 2 is an algorithm according to one embodiment of the present subject matter.

In one embodiment of the present subject matter, an exemplary method may be utilized to determine whether a geographic location of a mobile or wireless device has been spoofed or forged. For example, a determination may be made whether a calculated location of the device is within the boundary of a region, such as, but not limited to, a serving cell. If the geographic location falls outside of this region, then the possibility exists that the calculated location may contain spoofed or forged satellite measurements. If the geographic location of the device falls within the region, then the location may still be spoofed because the wireless device is geographically located at one place within the region and the measurements result in a calculated location at another place within the same region. FIG. 2 is an algorithm according to another embodiment of the present subject matter. With reference to FIG. 2, a method 200 is provided for determining whether an estimated location of a wireless device includes one or more forged satellite measurements. At step 210, the wireless device signals may receive signals from a first set of satellites for a region in which the wireless device is located. An exemplary region may be, but is not limited to, a serving area of a base station serving the wireless device, an approximate area of a communications network, a city, a municipality, a county, a state, a country, a continent, and the Earth. At step 220, an estimated location of the wireless device may then be determined from the signals received from the first set of satellites. The estimated location may then be identified as having a forged satellite measurement if the estimated location is not within the region at step 230. In another embodiment, the method may include determining another estimated location of the mobile device from signals received from a second set of satellites. This exemplary method may be further refined by embodiments discussed below.

Several attributes in satellite measurements may be utilized as a source for detecting location spoofing, such as, but not limited to, GNSS signal strength, satellite identification codes, number of satellite signals received, time intervals, clock bias, code phases, Doppler shift, and combinations thereof. For example, code phase measurements may allow a wireless device to derive a range to a satellite relative to the ranges to other satellites and may provide an important input to determining the respective pseudorange measurements. Doppler shift is generally a measured frequency shift between the wireless device and a satellite and is a measure of the relative velocity between the transmitter (e.g., the satellite) and the device (e.g., GNSS receiver) along a line of sight vector.

Doppler shift occurs because GNSS signals travel at the speed of light and the rate of change of the range between the respective satellite and receiver stretches or compresses the wavelength that is effectively measured at the receiver. For example, when a satellite approaches the receiver, the frequency will increase and when the satellite withdraws from the receiver, the frequency is reduced. An expected Doppler shift may be determined as a function of a calculated geographic location of a wireless device. The measured Doppler shift may then be compared against the expected Doppler shift and if the difference between the shifts is outside a predetermined threshold, then the geographic location of the device and any one, several or all satellite measurements may be identified as being forged or spoofed.

The Doppler in hertz (D) may be determined as the dot product of the difference in velocities between a satellite and receiver and an estimated line of sight vector by the following relationship:

$$D = \left(\frac{v_s - v_r}{c} \cdot \hat{l}_s\right) f \qquad (1)$$

Where $v_s$ represents the velocity of the satellite, $v_r$ represents the velocity of the receiver, c represents the speed of light, $l_s$ represents the estimated line of sight unit vector, and f represents the transmitted frequency of L1 (i.e., 1.5754 GHz). The c and f scalars may convert the result from $ms^{-1}$ to Hz. The line of sight vector may be determined as the difference between the satellite and receiver location divided by the norm of the difference as a function of the following relationship:

$$\hat{l}_s = \frac{r_s - \hat{r}_r}{|r_s - \hat{r}_r|} \qquad (2)$$

Figure 3:
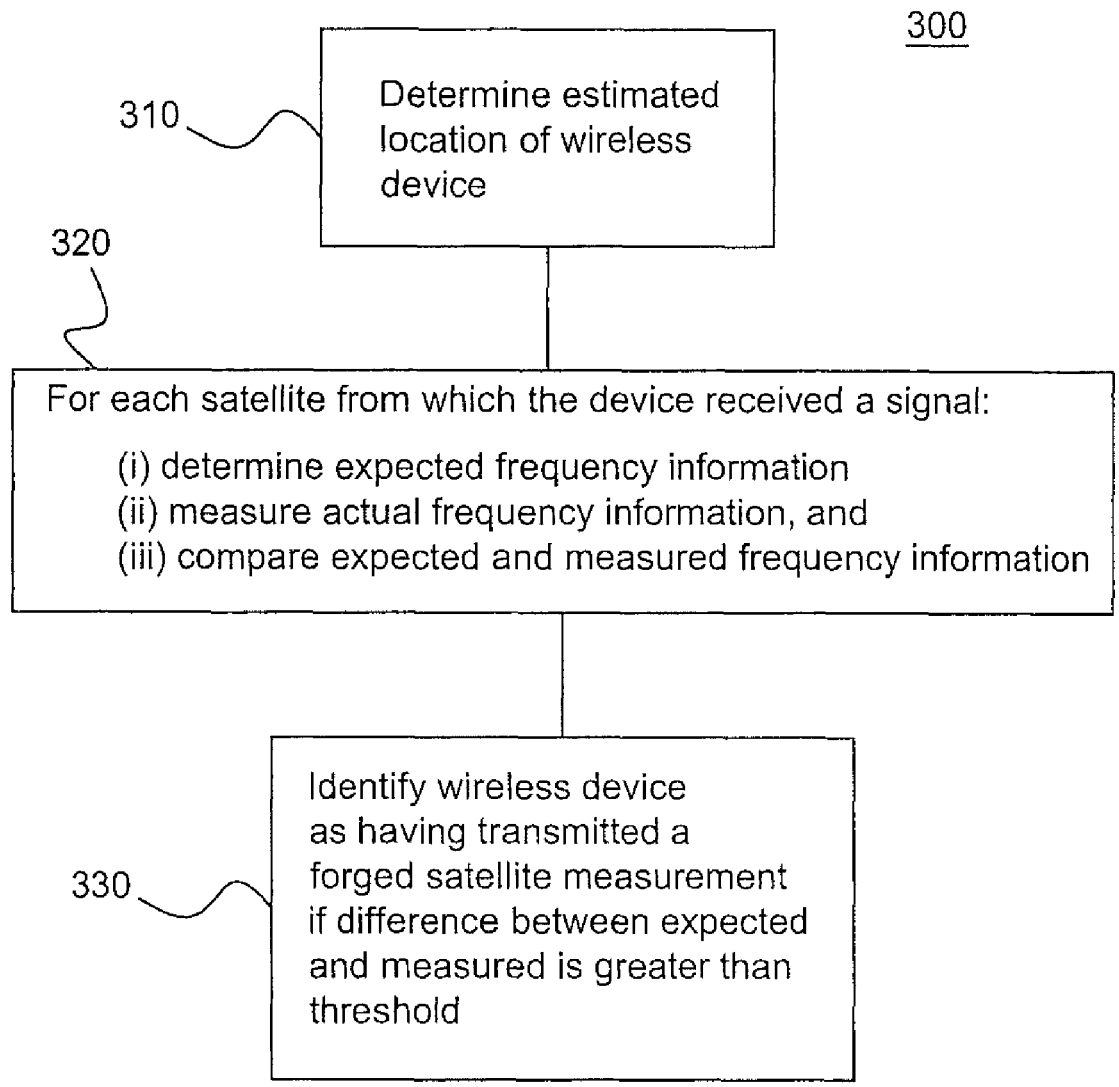
FIG. 3 is another algorithm according to an embodiment of the present subject matter.

FIG. 3 is another algorithm according to an embodiment of the present subject matter. With reference to FIG. 3, a method 300 is provided for determining whether a wireless device has transmitted one or more forged satellite measurements. At step 310, an estimated location of the wireless device may be determined. The estimated location may be determined as a function of coarse acquisition ("C/A") code phase information and/or signals provided by a cellular network. For example, a wireless device may provide a cell identification value in its initial location request, and from a cell table, the latitude, longitude, altitude and range for the cell may be determined to provide the estimated location. At step 320, for each one of the first set of satellites from which the wireless device receives a signal, expected frequency information may be determined as a function of the estimated location, actual frequency information may be measured, and the expected frequency information compared with the measured frequency information. Exemplary frequency information may include Doppler shift information. The wireless device may then be identified at step 330 as having transmitted a forged satellite measurement if a difference between the expected and measured frequency information is greater than a predetermined threshold. In another embodiment, step 330 may include identifying all forged satellite measurements transmitted by the wireless device. The method 300 may also include the step of determining another estimated location of the wireless device from signals received from a second set of satellites, the second set excluding the satellite having the forged measurement. Any of steps 310 through 330 may be iteratively repeated utilizing signals received from a second set of satellites. This second set of satellites may be a subset of the first set of satellites or may also be mutually exclusive of the first set of satellites.

Figure 4:
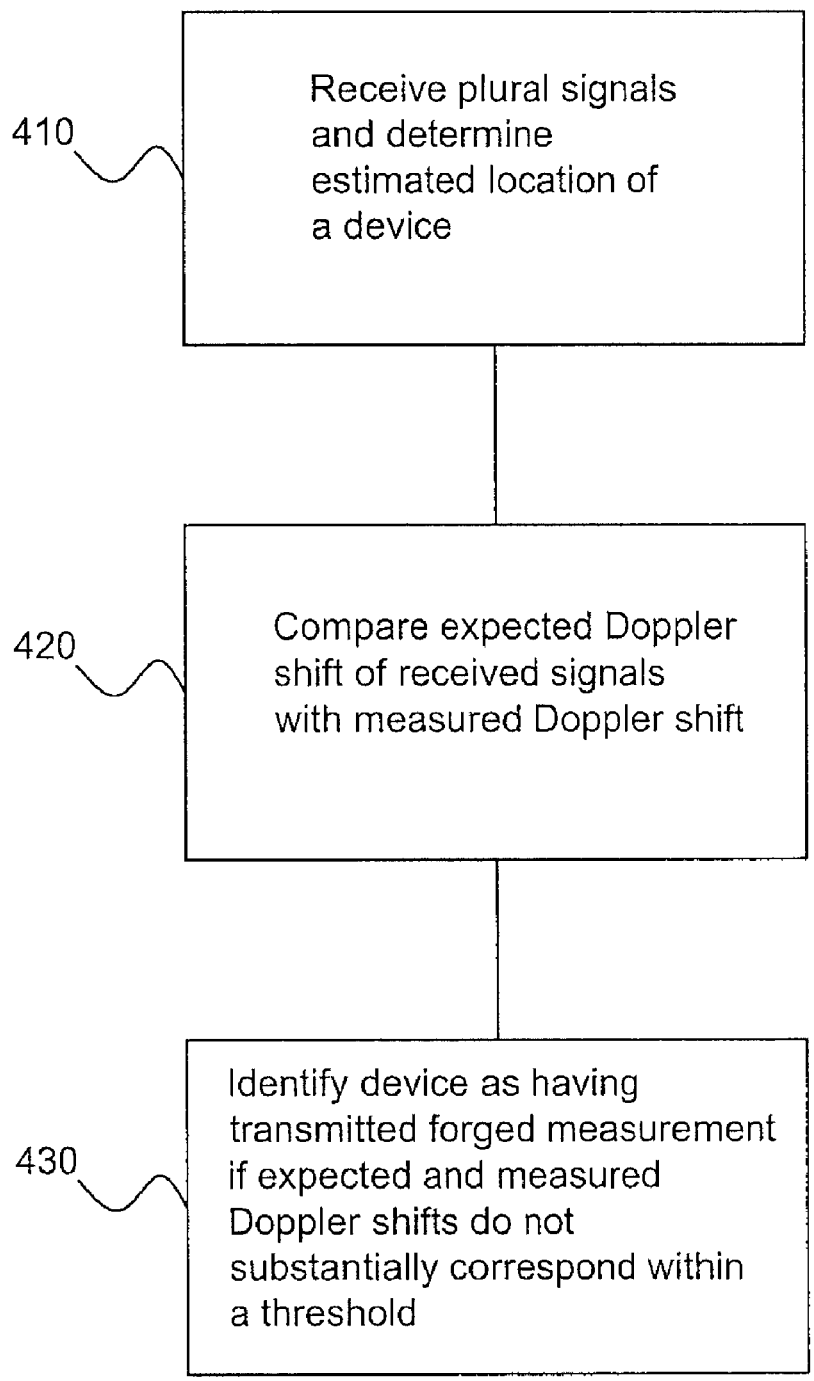
FIG. 4 is an algorithm according to another embodiment of the present subject matter.

FIG. 4 is an algorithm according to another embodiment of the present subject matter. With reference to FIG. 4, a method 400 for determining whether a wireless device has transmitted a forged satellite measurement is provided. The method may include receiving at the wireless device signals from a plurality of satellites and determining an estimated location of the wireless device from the signals provided by a cellular network, at step 410. The method may also comprise comparing expected Doppler shift determined as a function of the estimated location with the measured Doppler shift of the ones of received signals at step 420. The wireless device may then be identified as having transmitted a forged measurement if the expected and measured Doppler shifts do not substantially correspond within a predetermined threshold at step 430.

When satellite measurements are made there are many factors affecting the accuracy of the respective range measurements and hence the resulting position calculation. Exemplary factors may be, but are not limited to, ionosphere error, troposphere error, device measurement error and ephemeris error. The GPS position calculation function ("PCF") is a parametric least squares implementation. Inputs to the PCF is generally four or more satellite measurements with outputs being the location of the receiver and its respective clock bias. Another output of the least squares process is the residuals when there is an over-determined solution (e.g., five or more satellites in view). A simplified and non-limiting description of a residual is the difference between the actual observation and the computed distance between a satellite and the derived satellite position. Considering a scenario where only four satellites are available for a kinematic baseline, the observation redundancy would be zero and therefore all residuals would be zero as well. Thus, meaningful residuals for kinematic baselines can only be computed if there are enough satellites in view to give a sufficient redundancy. Residuals generally provide an indication of how much satellite measurements have changed to fit a position solution and thus reflect errors present in each measurement. One aspect of determining whether code phase information has been spoofed is whether the residuals reflect the errors that are normally measured. For example, when the residuals are below a normal or predetermined range, this is an acceptable indicator that certain satellite measurements have been spoofed. Residuals may be determined as a function of the following relationship:

$$\hat{v} = A\hat{x} - b \qquad (3)$$

where A represents partial derivatives of the functional model, x represents an estimate of a device's location, and b represents the observational model. Residuals may also be inputted into an exemplary method or algorithm that determines an uncertainty ellipse at a given confidence. In such an embodiment, a spoofed location may be indicative of a small uncertainty ellipse.

The sum of the squared residuals ("SSR") is the sum of the squared components of the residuals and may be provided by the following relationship:

$$SSR = \Sigma \hat{v}^2 \qquad (4)$$

The SSR of a typical receiver in a mobile device calculating a location thereof within ten meters is generally in the range of 200 to 8000 when there are eight satellites in view. For example, Table 1 below is from an independent operational test utilizing Motorola SiRF chipsets.

TABLE 1

| SSR for a Motorola (SiRF) implementation | |
|---|---|
| Number of Visible Satellites | SSR |
| 8 | 634.620 |
| 8 | 493.117 |
| 8 | 7560.866 |
| 8 | 271.024 |
| 8 | 2249.028 |
| 8 | 7475.900 |
| 8 | 1295.041 |
| 8 | 1876.897 |
| 8 | 206.079 |
| 8 | 1300.849 |

SSRs of a receiver in open-sky conditions may produce statistics as shown in Table 2 below.

TABLE 2

| SSR statistics from a NovAtel GPS reference receiver | | | | | |
|---|---|---|---|---|---|
| Number of Visible Satellites | Number of Observations | Average SSR | Standard Deviation of SSR | SSR 67% | SSR 95% |
| 5 | 173,211 | 6.66 | 13.61 | 8.39 | 13.86 |
| 6 | 2,268,482 | 17.53 | 27.75 | 22.09 | 36.47 |
| 7 | 11,589,266 | 28.85 | 376.38 | 36.35 | 60.01 |
| 8 | 25,602,257 | 52.46 | 4448.57 | 66.10 | 109.12 |
| 9 | 25,122,525 | 54.88 | 709.62 | 69.15 | 114.16 |
| 10 | 14,179,154 | 71.04 | 876.96 | 89.51 | 147.77 |
| 11 | 7,208,648 | 71.20 | 131.68 | 89.71 | 148.09 |
| 12 | 1,568,299 | 78.86 | 120.26 | 99.37 | 164.04 |

Figure 5:
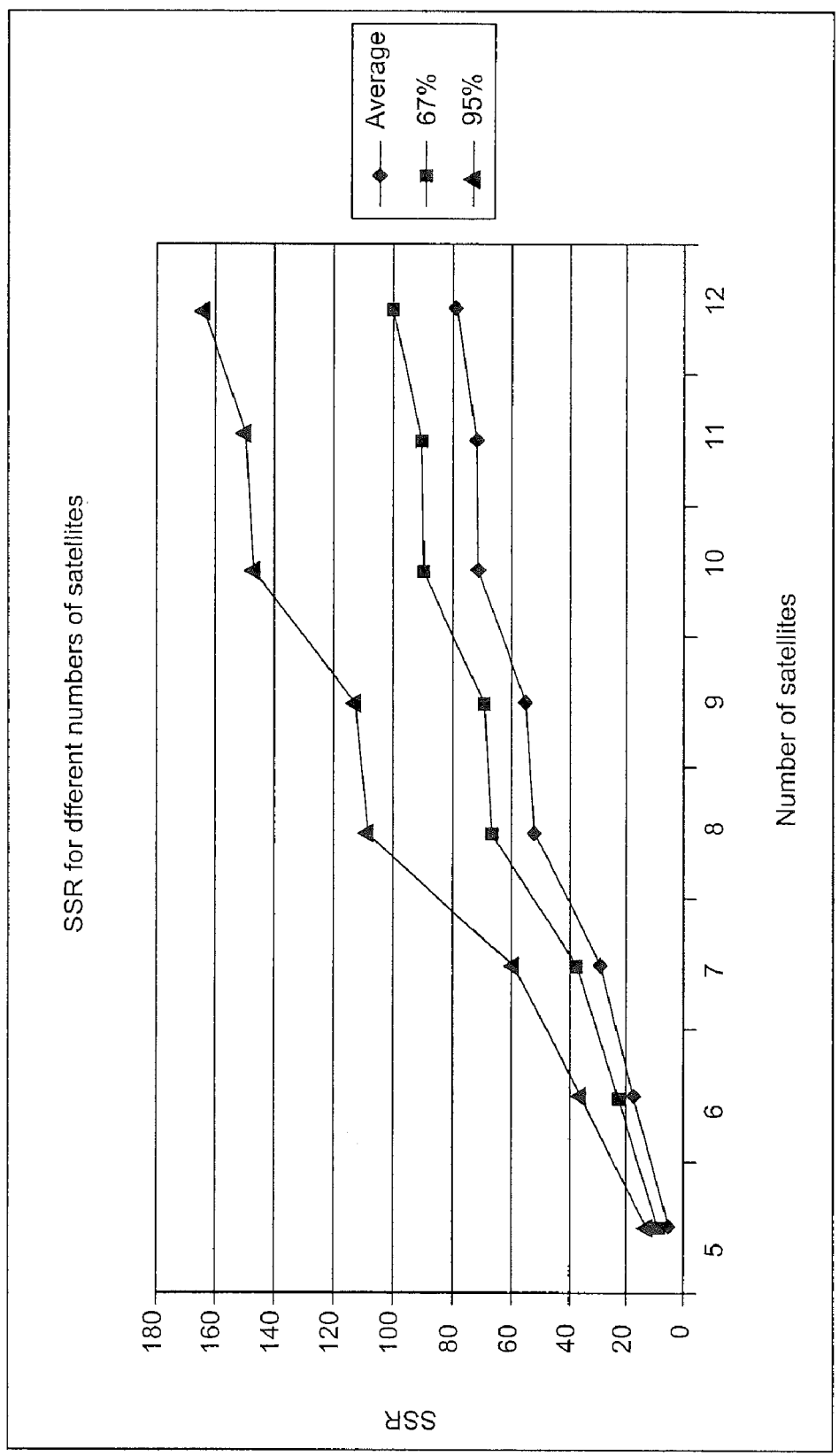
FIG. 5 is a graphical illustration of the SSR statistics from a NovAtel GPS reference receiver.

The results shown above in Table 2 are provided from a reasonable quality reference receiver continually tracking GPS satellites having a data set consisting of 87,713,876 individual measurements of the satellites in view of the receiver. FIG. 5 is a graphical illustration of the SSR statistics from a NovAtel GPS reference receiver. With reference to FIG. 5, the upward trend in SSR is as expected, e.g., more satellites result in more total error in the measurements. FIG. 5 also illustrates a substantially linear relationship between the number of satellites and SSR, i.e., as an extra satellite is considered, the SSR increases by a substantially constant amount.

In one embodiment of the present subject matter, a quality receiver operating in open sky conditions may be considered as a baseline for detection of a spoofing attack. For example, if a mobile device reports eight satellites that results in an SSR of less than 52.46, then the location may be considered as having spoofed or forged satellite measurements. The baseline statistics provided in Table 2 may be compared to the results shown below in Table 3 from an independent operational test utilizing a Sony-Ericsson device running a Broadcomm A-GPS chipset and later discovered as spoofing device.

TABLE 3

SSR for a Sony-Ericsson (Broadcomm) implementation

| Number of Visible Satellites | SSR |
| --- | --- |
| 8 | 3.756 |
| 8 | 2.111 |
| 8 | 2.392 |
| 8 | 2.243 |
| 8 | 2.232 |
| 8 | 2.252 |
| 8 | 2.778 |
| 8 | 3.546 |
| 8 | 2.535 |
| 8 | 1.897 |

The mobile device providing the SSR in Table 3 was considered to be a spoofer because the SSR was very low. In the experiment, the chipset supplier confirmed the results that the device was spoofing the code-phases provided to the MLC. Therefore, embodiments of the present subject matter may provide a baseline SSR threshold similar to that shown in Table 2; however, such a disclosure and the respective statistics should not limit the scope of the claims appended herewith as acceptable baselines and/or thresholds may be provided by any number of means, such as, but not limited to, mobile reference receivers, fixed reference receivers, a reference network having both mobile and fixed reference receivers, a wide area reference network, etc. Further, while the absolute numbers may be considered as a baseline, the respective thresholds may also be tuned as a function of the behavior of mobile devices in a communications network. Thus, when the measured SSR is less than the average provided by a reference network then the respective mobile device may be considered to be a spoofer.

Figure 6:
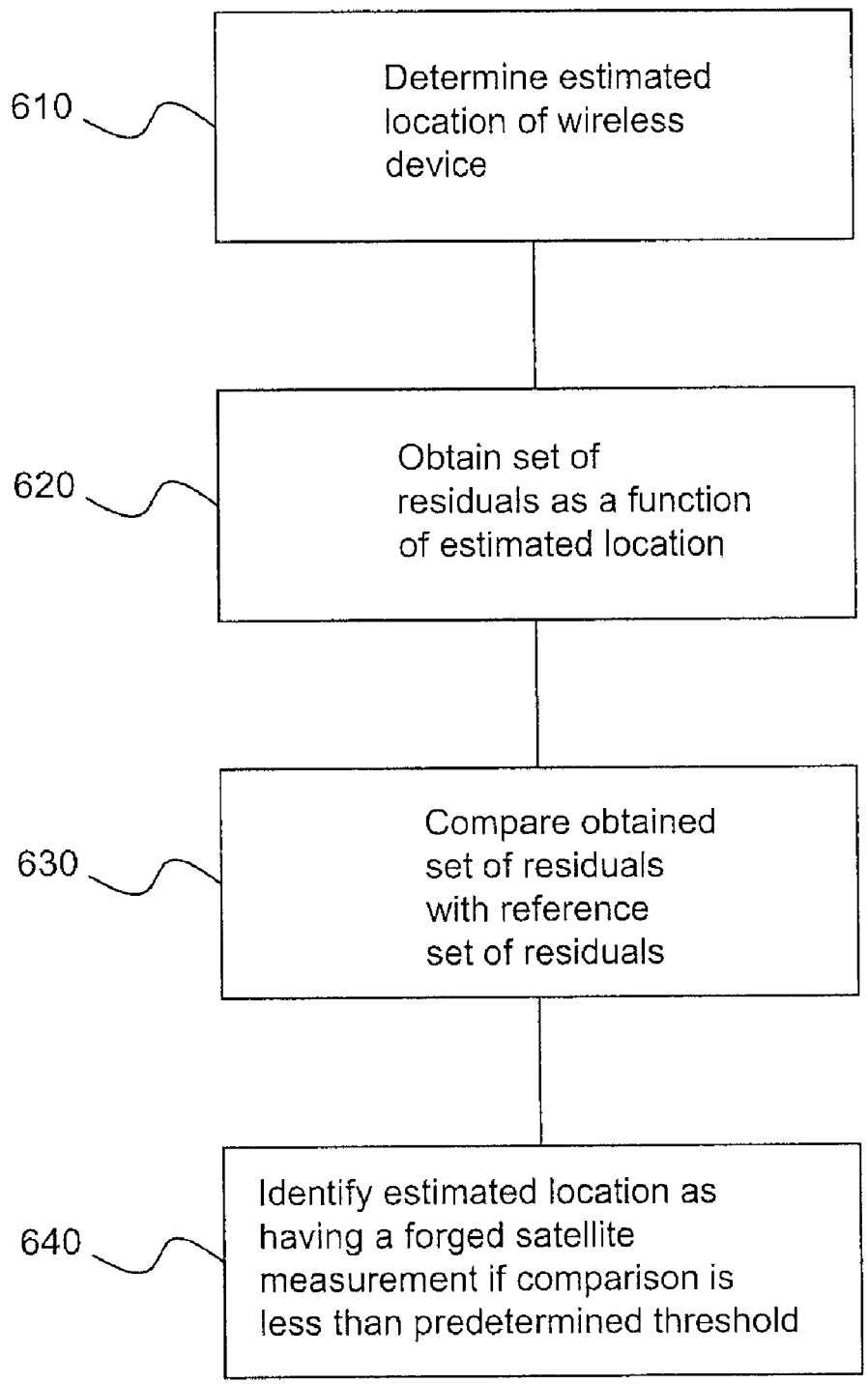
FIG. 6 is an algorithm according to one embodiment of the present subject matter.

FIG. 6 is an algorithm according to one embodiment of the present subject matter. With reference to FIG. 6, a method 600 is provided for determining whether an estimated location of a wireless device includes one or more forged satellite measurements. At step 610, an estimated location of the wireless device may be determined from signals received from a first set of satellites, and at step 620 a set of residuals obtained as a function of the estimated location. In one embodiment, the estimated location may be determined as a function of C/A code phase shift information, Doppler information, and/or signals provided by a cellular network. The obtained set of residuals may then be compared to a reference set of residuals at step 630. The reference set of residuals may be provided by a database having information from an exemplary reference station network including a plurality of geographically dispersed reference stations. These reference stations may be fixed reference stations, mobile reference stations, or combinations thereof. As discussed above, if the comparison between the obtained set and reference set of residuals is less than a predetermined threshold, then at step 640 the estimated location may be identified as having one or more forged satellite measurements. In another embodiment, step 630 may include comparing the SSR for the obtained set to the SSR for the reference set or may include comparing the SSR for the obtained set to an average SSR for a plurality of reference sets. Of course, the method 600 may further include determining another estimated location of the wireless device from signals received from a second set of satellites, the second set excluding a satellite having a forged measurement. Any of steps 610 through 640 may be iteratively repeated utilizing signals received from a second set of satellites. This second set of satellites may be a subset of the first set of satellites or may also be mutually exclusive of the first set of satellites.

Figure 7:
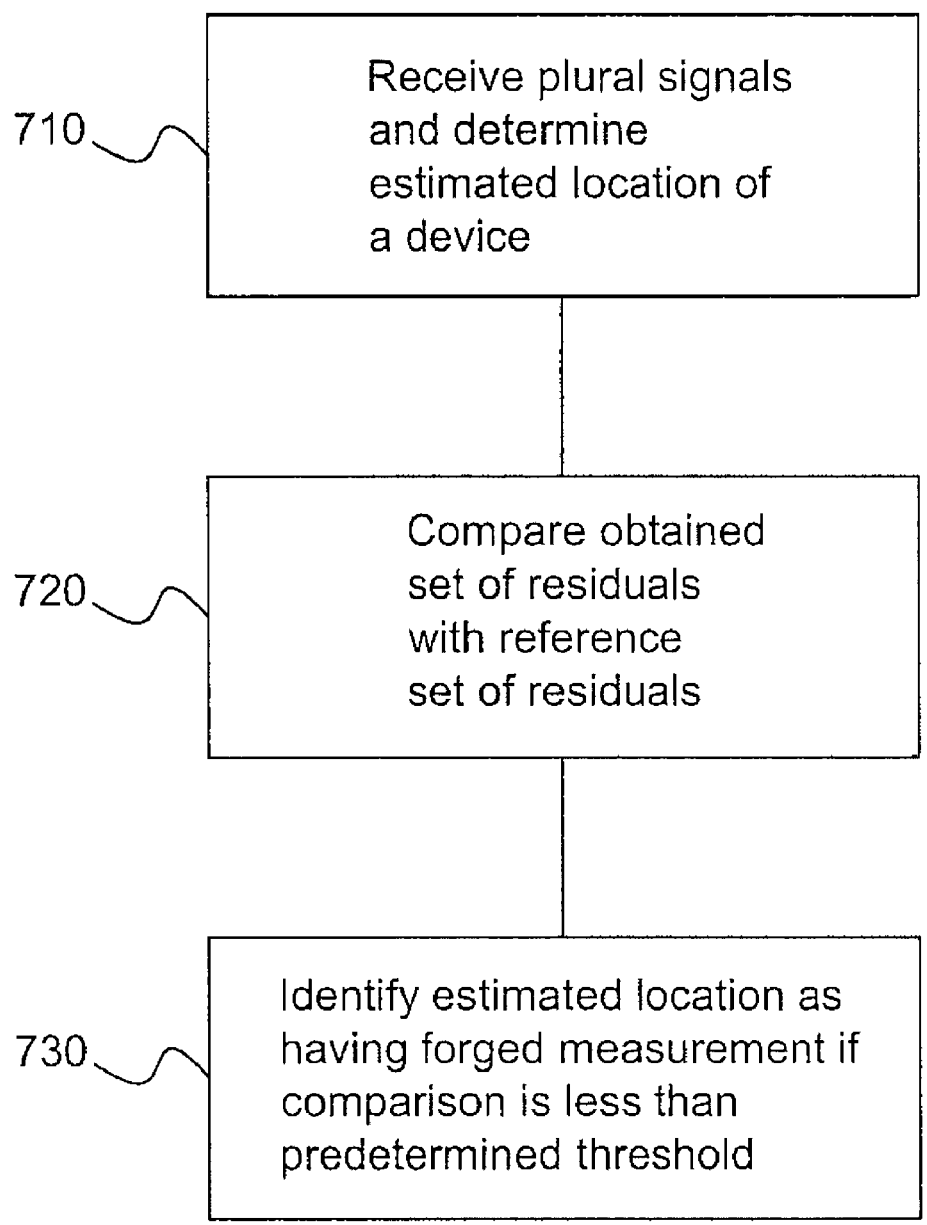
FIG. 7 is an algorithm according to another embodiment of the present subject matter.

FIG. 7 is an algorithm according to another embodiment of the present subject matter. With reference to FIG. 7, a method 700 is provided for determining whether an estimated location of a wireless device includes a forged satellite measurement. At step 710, signals may be received at the wireless device from a plurality of satellites and an estimated location thereof determined. At step 720, a set of residuals obtained from the estimated location may be compared with a reference set of residuals. At step 730, the estimated location may be identified as having a forged satellite measurement if the comparison is less than a predetermined threshold.

Another exemplary method for detection of spoofing attacks may be through the analysis of code phases relative to what would be produced by an artificial (or simulated) means, e.g., when calculating the acquisition assistance data type. Acquisition assistance data type is generally an assistance data type where code phases and Doppler shifts are calculated as a function of a given location. The calculation may be provided with an uncertainty area or ellipse utilized to determine the uncertainty in chips (and Doppler) for a mobile device to search. Conventionally, acquisition assistance data may be provided to a mobile device by handset-assisted A-GPS to ensure the device locks onto and acquires signals from appropriate satellites. The assistance data may then be determined as a function of an approximate location of the device and an uncertainty of the approximate location of the device. In this instance, a spoofer attempting to emulate a specific location is likely to calculate expected code phases (from that location) and provide the expected code phases to the location determining system (e.g., MLC). The location determining system may then compare the reported code phases to its respective acquisition assistance data calculations and if the comparison indicates the code phases are within or outside a predetermined threshold or uncertainty window, then the measurements may be identified as being spoofed.

The MLC may compare relative code phases (or the difference between code phases) because the clock in the respective mobile device may not be properly synchronized to GPS timing. One aspect to note during such a comparison of measured values against server calculated values is whether the differences between the measurements match. For example, if a mobile device reports satellite PRN 5 as 100 chips and PRN 6 as 200 chips, and the location determining system calculates PRN 5 as 400 chips and PRN 6 as 500 chips with a search window of 1 chip, then this may be considered to be a match, as the difference is within the search window, and the mobile device classified as a spoofer.

Figure 8:
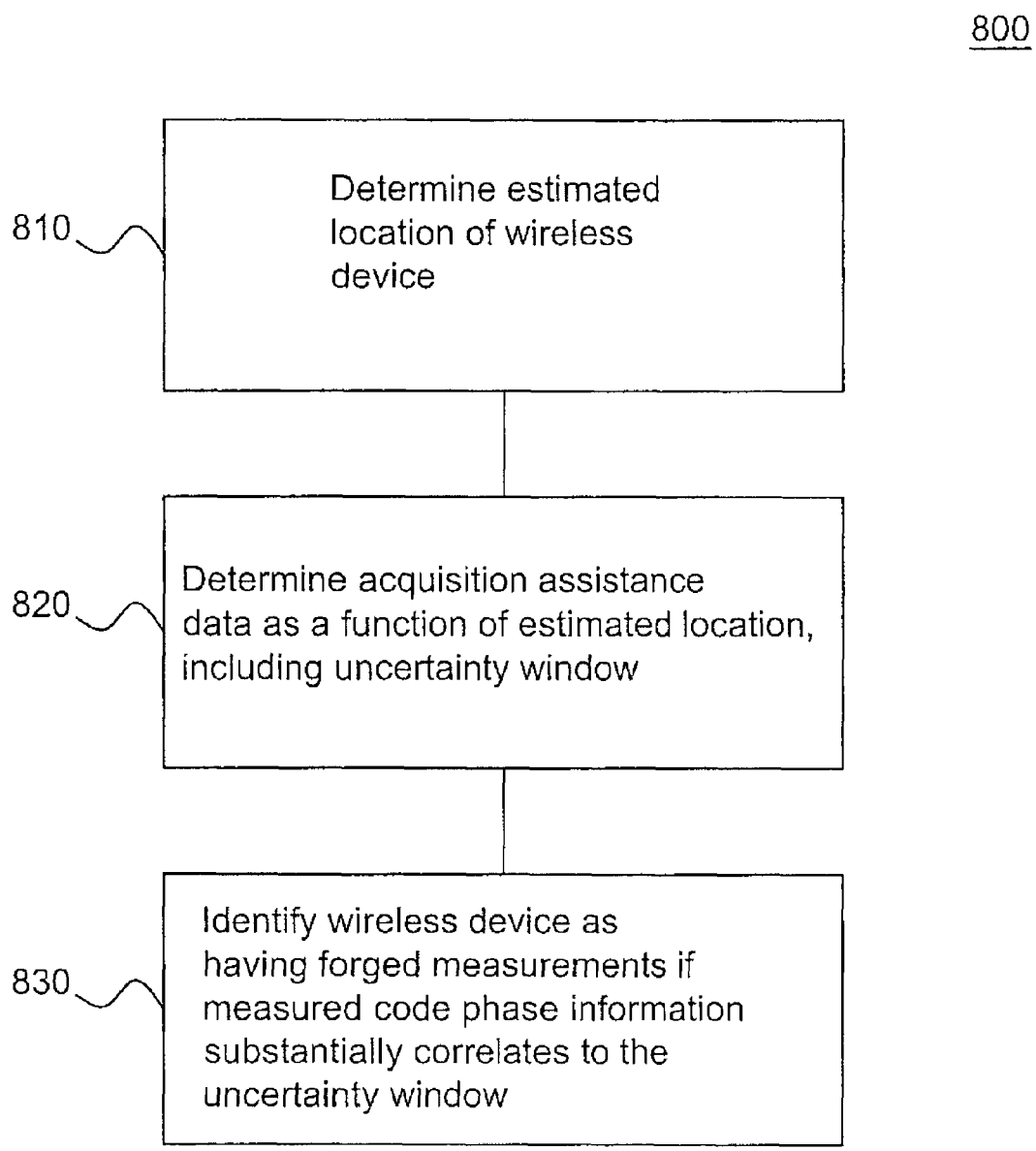
FIG. 8 is an algorithm according to an embodiment of the present subject matter.

FIG. 8 is an algorithm according to an embodiment of the present subject matter. With reference to FIG. 8, a method 800 is provided for determining whether a wireless device has transmitted one or more forged satellite measurements. At step 810, an estimated location of the wireless device may be determined. The estimated location may be determined as a function of coarse acquisition ("C/A") code phase information and/or signals provided by a cellular network. For example, a wireless device may provide a cell identification value in its initial location request, and from a cell table, the latitude, longitude, altitude and range for the cell may be determined to provide the estimated location. At step 820, acquisition assistance data for a first set of satellites may be determined as a function of the estimated location, the assistance data including an uncertainty window. At step 830, if measured code phase information from the wireless device substantially correlates to the uncertainty window, then the wireless device may be identified as having transmitted one or more forged satellite measurements. An exemplary uncertainty window may be, but is not limited to, a code phase uncertainty window. In one embodiment, step 830 may further include comparing relative code phase information for ones of the first set of satellites from which the wireless device receives a signal, and identifying the wireless device as having transmitted a forged satellite measurement if a difference between the relative code phase information is substantially outside the uncertainty window. In this embodiment, the relative code phase information may represent a difference between code phase information reported by the wireless device and code phase information determined by a location information server. Of course, the method 800 may further include determining another estimated location of the wireless device from signals received from a second set of satellites, the second set excluding a satellite having a forged measurement. Any of steps 810 through 830 may be iteratively repeated utilizing signals received from a second set of satellites. This second set of satellites may be a subset of the first set of satellites or may also be mutually exclusive of the first set of satellites.

Figure 9:
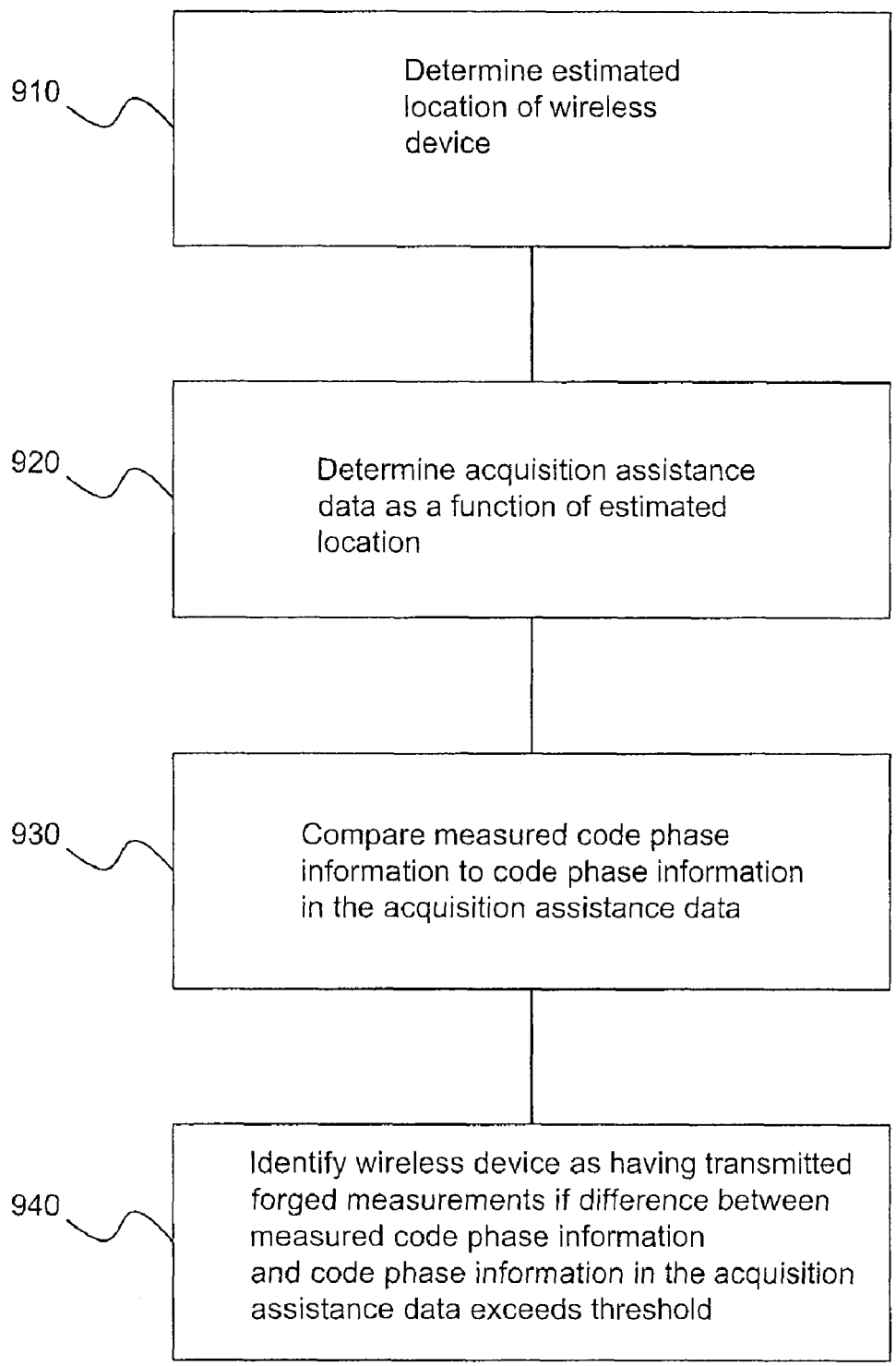
FIG. 9 is another algorithm according to an embodiment of the present subject matter.

FIG. 9 is another algorithm according to an embodiment of the present subject matter. With reference to FIG. 9, a method 900 is provided for determining whether a wireless device has transmitted one or more forged satellite measurements. At step 910, an estimated location of the wireless device may be determined. The estimated location may be determined as a function of coarse acquisition ("C/A") code phase information and/or signals provided by a cellular network. For example, a wireless device may provide a cell identification value in its initial location request, and from a cell table, the latitude, longitude, altitude and range for the cell may be determined to provide the estimated location. At step 920, acquisition assistance data for a first set of satellites may be determined as a function of the estimated location. For ones of the first set of satellites from which the wireless device receives a signal, the measured code phase information may be compared to code phase information in the determined acquisition assistance data at step 930. If a difference between measured code phase information for ones of the first set of satellites and code phase information in the determined acquisition assistance data for the same ones of satellites is greater than a predetermined threshold, then at step 940, the wireless device may be identified as having transmitted one or more forged satellite measurements. The method 900 may further include determining another estimated location of the wireless device from signals received from a second set of satellites, the second set excluding a satellite having a forged measurement. Any of steps 910 through 940 may be iteratively repeated utilizing signals received from a second set of satellites. This second set of satellites may be a subset of the first set of satellites or may also be mutually exclusive of the first set of satellites.

Figure 10:
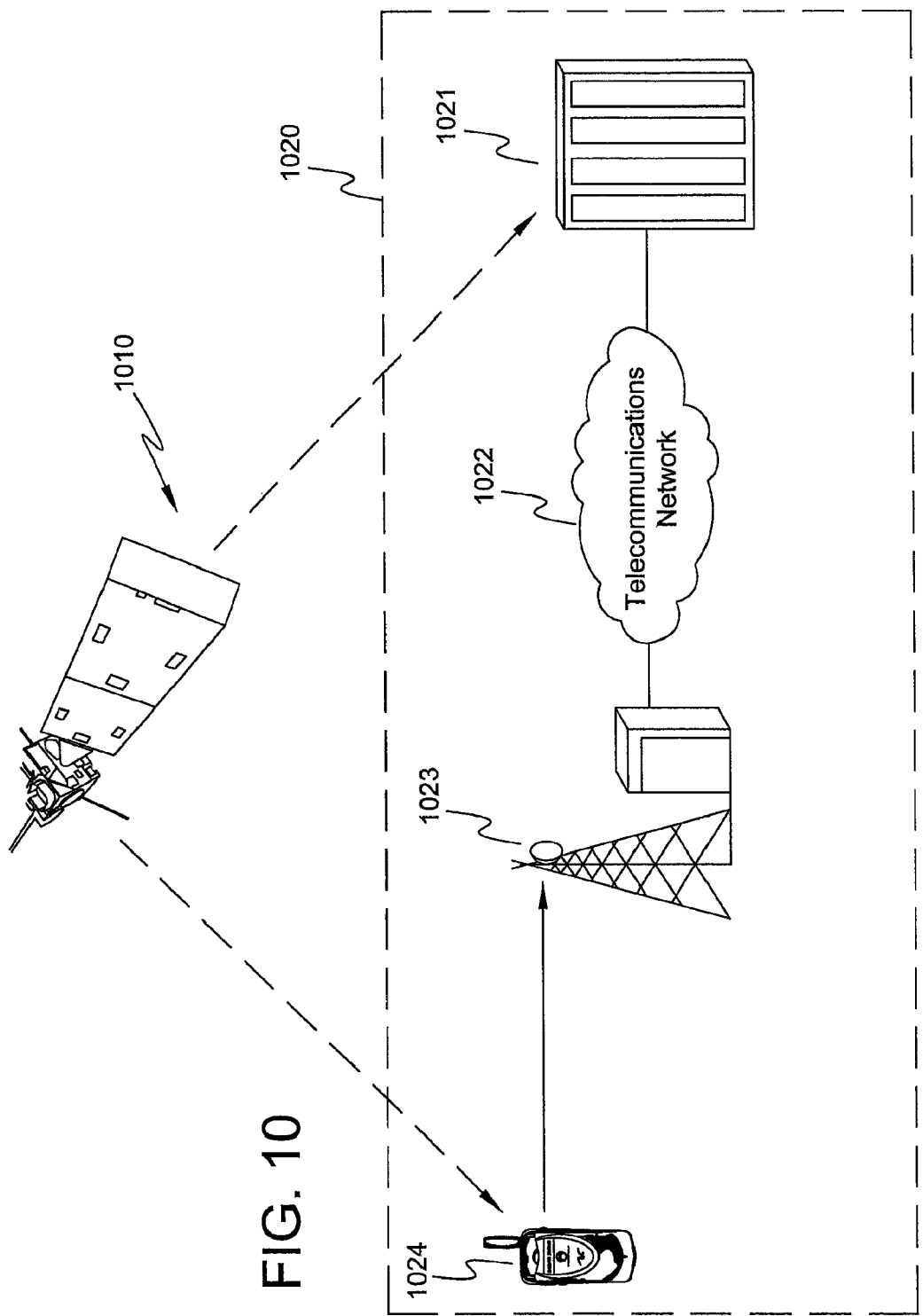
FIG. 10 is a schematic representation for implementing one embodiment of the present subject matter.

FIG. 10 is a schematic representation for implementing embodiments of the present subject matter. With reference to FIG. 10, a satellite system 1010 may communicate with a terrestrial system 1020. An exemplary satellite system 1010 may be a GNSS such as, but not limited to, a GPS, Galileo system, GLONASS system, QZSS, Compass system, Bediou system, etc. The ground system 1020 may include a cellular network having a location center 1021 and may receive information from or include a SBAS, WAAS, EGNOS, digital television network, and combinations thereof. The location center 1021 may be an MLC, LIS or other network component such as a central office configured to communicate with a telecommunications network 1022 and/or at least one base station 1023. The location center 1021 may include a receiver for receiving signals transmitted from a mobile device 1024, and circuitry for determining the location of the mobile device 1024 as a function of received signals from the device 1024. The location center 1021 may also include a database having information from a reference network such as a WARN. Exemplary reference networks may include a plurality of geographically dispersed reference stations and may include fixed reference stations, mobile reference stations, or combinations thereof. In a further embodiment, the location center 1021 may include a transmitter for transmitting to the mobile device 1024 acquisition assistance data, a location request, and other information and data. Exemplary devices 1024 may be, but are not limited to, a cellular device, text messaging device, computer, portable computer, vehicle locating device, vehicle security device, communication device, or wireless transceiver.

In one embodiment, the location center 1021 may also include circuitry for determining expected frequency information as a function of an estimated location, circuitry for measuring actual frequency information, circuitry for comparing the expected frequency information with the measured frequency information, and circuitry for identifying the device 1024 as having transmitted a forged satellite measurement if the difference between the expected and measured frequency information is greater than a predetermined threshold. In another embodiment, the location center 1021 may also include circuitry for calculating a set of residuals as a function of an estimated location, circuitry for comparing the obtained set of residuals to a reference set of residuals provided by a reference network, and circuitry for identifying the estimated location as having one or more forged satellite measurements if the comparison between the obtained set and reference set of residuals is less than a predetermined threshold. In an additional embodiment, the location center 1021 may include circuitry for determining an estimated location of the wireless device, circuitry for determining acquisition assistance data as a function of the estimated location, the assistance data including an uncertainty window, circuitry for identifying the wireless device as having transmitted one or more forged satellite measurements if received code phase information from the device 1024 substantially correlates to the uncertainty window, and/or circuitry for comparing received code phase information from the device 1024 to code phase information in the determined acquisition assistance data.

As shown by the various configurations and embodiments illustrated in FIGS. 1-10, a method and system for determining falsified satellite measurements and falsified geographic locations have been described.

While preferred embodiments of the present subject matter have been described, it is to be understood that the embodiments described are illustrative only and that the scope of the invention is to be defined solely by the appended claims when accorded a full range of equivalence, many variations and modifications naturally occurring to those of skill in the art from a perusal hereof.

What we claim is:

1. A method for determining whether a wireless device has transmitted one or more forged satellite measurements, comprising the steps of:
   (a) determining an estimated location of the wireless device, the estimated location including a predetermined uncertainty area;
   (b) determining acquisition assistance data for a first set of satellites as a function of the estimated location by a location determining system, the assistance data including a code phase uncertainty window corresponding to said predetermined uncertainty area;
   (c) for ones of the first set of satellites from which the wireless device receives a signal, comparing code phase information measured by the device to code phase information in the determined acquisition assistance data; and
   (d) at the location determining system identifying one or more forged satellite measurements if a difference between said measured code phase information for said ones of the first set of satellites and said code phase information in the determined acquisition assistance data for the same ones of satellites is greater than a predetermined threshold, said predetermined threshold being defined by said code phase uncertainty window.

2. The method of claim 1 wherein the measured code phase information is coarse acquisition ("C/A") code phase shift information.

3. The method of claim 1 wherein the estimated location is determined as a function of Doppler information.

4. The method of claim 1 wherein the estimated location is determined as a function of signals provided by a cellular network.

5. The method of claim 1 further comprising the step of determining another estimated location of the wireless device from signals received from a second set of satellites, the second set excluding a satellite having a forged measurement.

6. The method of claim 1 further comprising the step of:
   (e) repeating steps (a) through (d) using signals received from a second set of satellites.

7. The method of claim 6 wherein the second set of satellites is a subset of the first set of satellites.

8. The method of claim 6 wherein the second set of satellites is mutually exclusive of the first set of satellites.

9. The method of claim 1 wherein the wireless device is selected from the group consisting of: cellular device, text messaging device, computer, portable computer, vehicle locating device, vehicle security device, communication device, and wireless transceiver.

10. The method of claim 1 wherein the satellites are a part of a Global Navigation Satellite System ("GNSS").

11. The method of claim 10 wherein the GNSS is selected from the group consisting of: a Global Positioning System ("GPS"), Galileo system, GLONASS system, Quasi-Zenith Satellite System ("QZSS"), Beidou satellite system, Compass satellite system, and combinations thereof.

12. A system for determining whether a wireless device has transmitted one or more forged satellite measurements, comprising:
   first circuitry configured to determine an estimated location of the wireless device, the estimated location including a predetermined uncertainty area;
   second circuitry configured to determine acquisition assistance data for a first set of satellites as a function of the estimated location, the assistance data including a code phase uncertainty window corresponding to said predetermined uncertainty area;
   third circuitry configured to compare code phase information measured by the device to code phase information in the determined acquisition assistance data for ones of the first set of satellites from which the wireless device receives a signal; and
   fourth circuitry configured to identify one or more forged satellite measurements if a difference between said measured code phase information for said ones of the first set of satellites and said code phase information in the determined acquisition assistance data for the same ones of satellites is greater than a predetermined threshold, said predetermined threshold being defined by said code phase uncertainty window.

13. The system of claim 12 wherein the measured code phase information is coarse acquisition ("C/A") code phase shift information.

14. The system of claim 12 wherein the estimated location is determined as a function of Doppler information.

15. The system of claim 12 wherein the estimated location is determined as a function of signals provided by a cellular network.

16. The system of claim 12 further comprising circuitry for determining another estimated location of the wireless device from signals received from a second set of satellites, the second set excluding a satellite having a forged measurement.

17. The system of claim 12 further comprising:
   fifth circuitry for determining an estimated location of the wireless device;
   sixth circuitry for determining acquisition assistance data for a second set of satellites as a function of the estimated location;
   seventh circuitry for comparing code phase information measured by the device to code phase information in the determined acquisition assistance data for ones of the second set of satellites from which the wireless device receives a signal; and
   eighth circuitry for identifying one or more forged satellite measurements if a difference between measured code phase information for ones of the second set of satellites and code phase information in the determined acquisition assistance data for the same ones of satellites is greater than a predetermined threshold.

18. The system of claim 17 wherein the second set of satellites is a subset of the first set of satellites.

19. The system of claim 17 wherein the second set of satellites is mutually exclusive of the first set of satellites.

20. The system of claim 17 wherein said sixth circuitry is the same as said second circuitry, said seventh circuitry is the same as said third circuitry, and said eighth circuitry is the same as said fourth circuitry.

21. The system of claim 12 wherein the wireless device is selected from the group consisting of: cellular device, text messaging device, computer, portable computer, vehicle locating device, vehicle security device, communication device, and wireless transceiver.

22. The system of claim 12 wherein the satellites are a part of a Global Navigation Satellite System ("GNSS").

23. The system of claim 22 wherein the GNSS is selected from the group consisting of: a Global Positioning System ("GPS"), Galileo system, GLONASS system, Quasi-Zenith Satellite System ("QZSS"), Beidou satellite system, Compass satellite system, and combinations thereof.

* * * * *